N. G. ROSS.
Barbed Wire Fence.

No. 216,294. Patented June 10, 1879.

Witnesses:
F. B. Townsend
A. W. Munday

Inventor:
Noble G. Ross
per Munday & Evarts
Attorneys.

UNITED STATES PATENT OFFICE.

NOBLE G. ROSS, OF CHICAGO, ILLINOIS.

IMPROVEMENT IN BARBED-WIRE FENCES.

Specification forming part of Letters Patent No. 216,294, dated June 10, 1879; application filed April 21, 1879.

*To all whom it may concern:*

Be it known that I, NOBLE G. ROSS, of Chicago, in the county of Cook and State of Illinois, have invented certain Improvements in Barbed-Wire Fences, of which the following is a specification.

This invention relates to an improved form of four-pointed barb to be applied to a two-strand fence.

Figure 1:
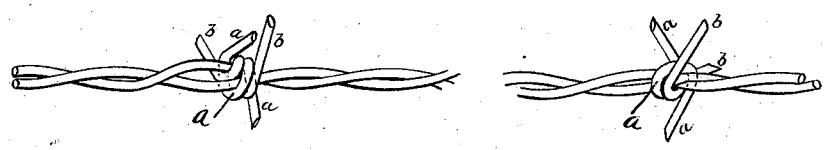
Figure 2:
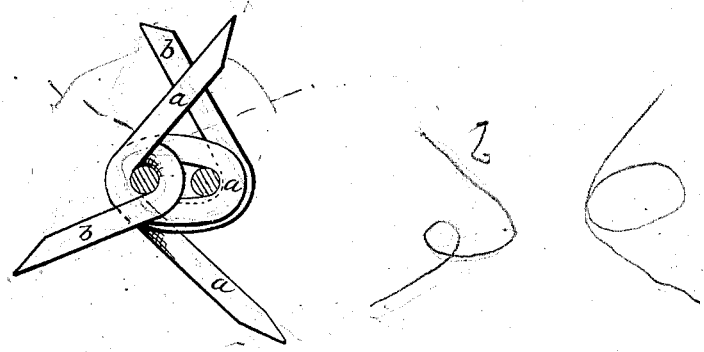

In the accompanying drawings, Figure 1 shows views of different sides of a section of such fence with my improved barb in position thereon. Fig. 2 is a cross-section of the same upon an enlarged scale, giving a side view of the barb.

The barb is formed of two pieces of wire, *a* and *b*. Of these, the one lettered *b* is wrapped entirely around one of the fence-wires, and one of its ends is also carried partially around and lapped down upon the other fence-wire with a quarter turn or thereabout, so that its total bend is something over a complete turn. The other piece, *a*, does not pass around either fence-wire individually, but does entirely encircle both of them with something more than a complete turn. Both pieces are coiled together so as to interlock them—that is to say, so that the coiled portion of each is between the outstanding points of the other. The result of this feature is that one point of each piece is at each side of the barb, as shown in Fig. 2, which figure also explains what I mean by the expression "side of the barb" in this connection.

To secure good results in interlocking I coil both pieces simultaneously, with machinery made for the purpose, as that enables me to obtain not only a firm clamp upon the fence-wires, but also to lay the coiled portions close together, making the barb very tight upon the wires, and also rendering the component parts of the barb inseparable. I do not wish, however, to be confined to a simultaneously-coiled barb for obvious reasons.

Both pieces of wire are given, as will be noticed, a bend of about one and a quarter turn.

I am well aware that the Letters Patent to A. S. Burnell, No. 192,225, dated June 19, 1877, show a pointed barb, one point of each part of which is inserted between the fence-strands, the bend from both parts being from thence in opposite directions around both strands. I do not claim that construction. My barb is simpler, more easily applied, requires much less complicated machinery, and does not spread the fence-strands to the same extent, while it is equally as strong, rigid, and inseparable.

I am also aware that Letters Patent have been granted to Frank Billings, dated June 25, 1878, No. 205,234, wherein is shown a four-pointed barb upon a two-strand fence. The difference between that construction and this invention is marked. In the patent one part of the barb is clamped upon only one of the fence-strands, while in the invention both parts are clamped upon both fence-strands. This is no more difficult to put on than the other, and is more rigid.

I lay no claim in this application to the construction shown in the Billings patent, because I have another application pending which conforms more closely thereto.

I claim—

The combination, with a two-strand fence-cable, of a four-pointed barb formed of two pieces of wire, one of which is passed entirely around one strand with one of its ends lapped down upon the other strand, while the other piece is passed outside both strands with something more than a complete turn, a portion of the bend of each piece being between the outstanding points of the other piece, substantially as specified.

NOBLE G. ROSS.

Witnesses:
EDW. S. EVARTS,
H. M. MUNDAY.